Oct. 4, 1949.                     E. C. MAGDEBURGER                    2,483,654
                    EXHAUST TURBINE FOR INTERNAL-COMBUSTION ENGINES
Filed Dec. 9, 1944                                              2 Sheets-Sheet 1
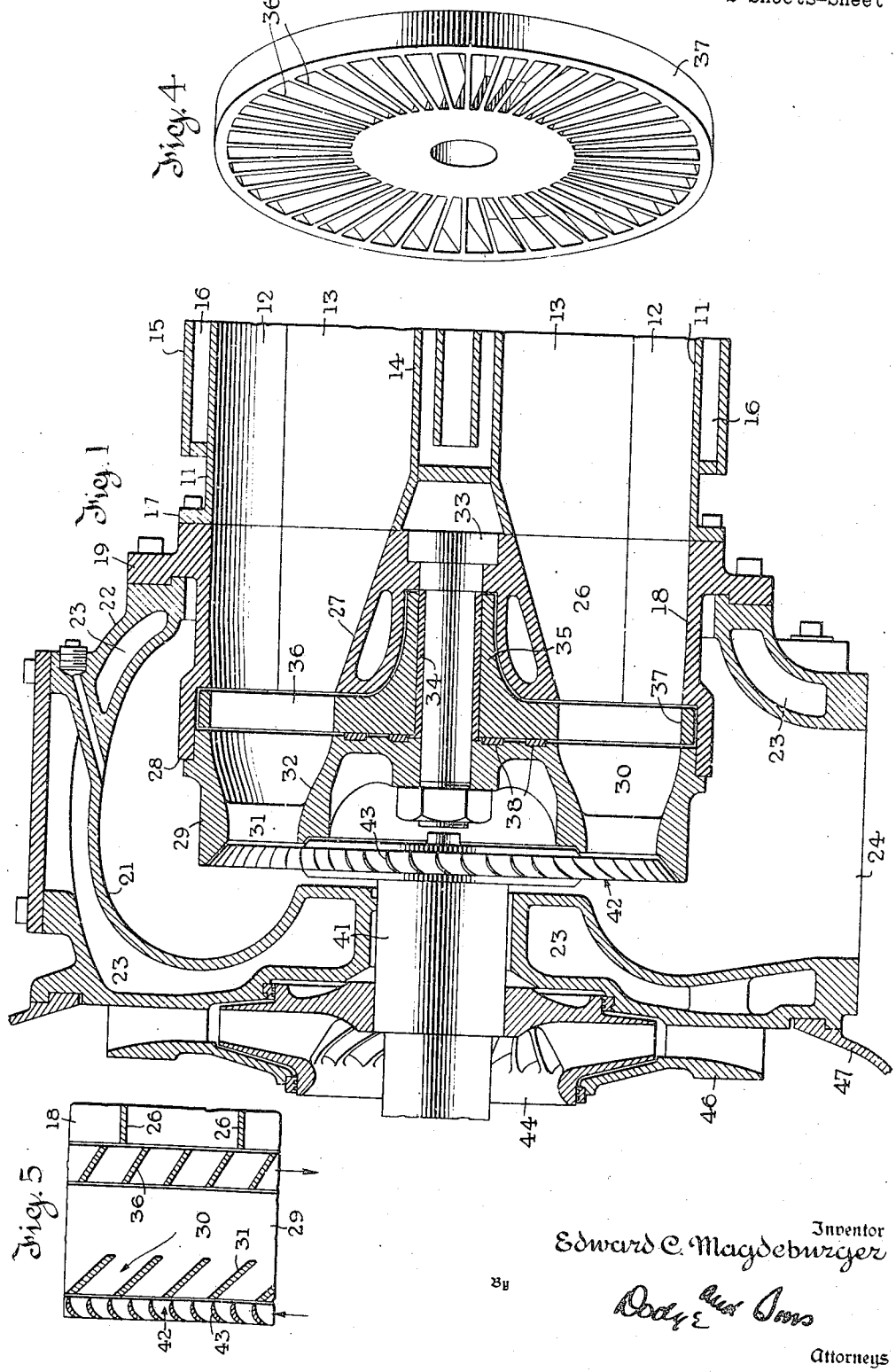
Inventor
Edward C. Magdeburger
By
Dodge and Sons
Attorneys Oct. 4, 1949.  E. C. MAGDEBURGER  2,483,654
EXHAUST TURBINE FOR INTERNAL-COMBUSTION ENGINES
Filed Dec. 9, 1944  2 Sheets-Sheet 2
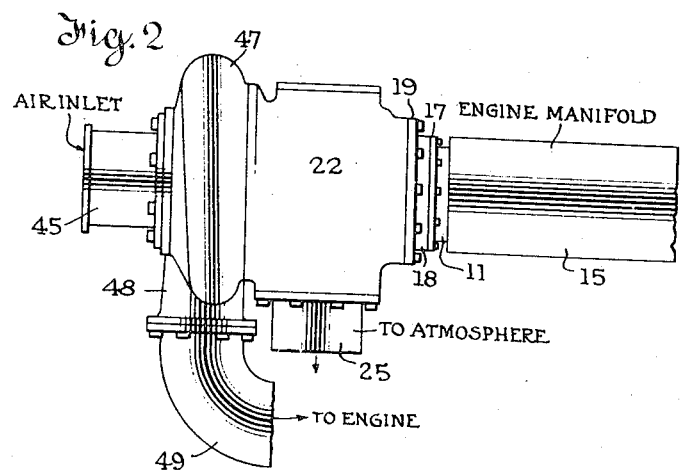
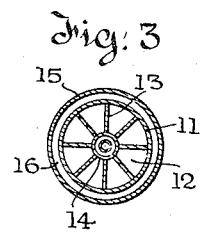
Inventor
Edward C. Magdeburger
By
Dodge and Imo
Attorneys Patented Oct. 4, 1949

2,483,654

UNITED STATES PATENT OFFICE 2,483,654

EXHAUST TURBINE FOR INTERNAL-COMBUSTION ENGINES

Edward C. Magdeburger, Washington, D. C.

Application December 9, 1944, Serial No. 567,359

4 Claims. (Cl. 253—57)

This invention relates to methods of and means for improving exhaust flows from a multicylinder internal combustion engine. Such flow is to the atmosphere either directly or through a turbine, for example the turbine which drives a turbo charger.

When a plurality of cylinders exhaust into a single manifold the kinetic energy of the exhaust is dissipated. Indeed the energy of an exhaust puff from any cylinder commonly causes cross flow to and back flow into the exhaust connection of other cylinders, so that the interaction actually impedes exhaust.

The invention suppresses these cross flows and back flows, and applies the energy of each exhaust puff to reduction of the back pressure in all other exhaust connections. The invention will be described as applied in connection with a turbo charger.

With turbo-charged compression-ignition engines the practice has been to use separate exhaust pipes for groups of two or three cylinders, the cylinders exhausting into any one pipe being so chosen that their exhaust periods do not materially overlap. This ameliorates the conditions, but does not give unidirectional flows, since there is considerable surging flow in each exhaust pipe, with consequent energy losses.

One exhaust pipe for each cylinder would give much better flow but has been considered impracticable, because of a belief that it was necessary to continue segregation clear to the guide ring of the turbine. In consequence each exhaust pipe could feed only a small arc of guides, and the guide ring and the associated turbine runner must be prohibitively large and expensive.

The present invention is based on the concept that the use of a freely running rotary element of substantial mass and having a fly wheel effect on the flowing gases would improve performance, particularly in any case where exhaust gas velocities were low. The suggestion that the principle is applicable where velocities are low does not imply that it is inapplicable or that it offers no advantages at high velocities, for the contrary is the fact.

In carrying out the invention the exhaust passages lead to an annular chamber on the entrance side of the guide ring of the turbine. To reach this chamber the gases pass through oblique vanes on a stabilizing runner which preferably is concentric with the guide ring. This runner absorbs energy from each exhaust puff and consequently is driven at high speed. Between puffs from any given exhaust passage it acts as an impeller, tending to evacuate that passage. Thus the absorbed energy is usefully applied and cross flows are substantially resisted or even prevented.

The free-running stabilizing runner preferably rotates in the direction opposite to that of the turbine runner, when a turbine runner is used. They may, however, rotate in the same direction.

A preferred embodiment of the invention will now be described in detail by reference to the accompanying drawings, in which Figure 1 is an axial section through the end of a subdivided manifold and through a connected turbo charger. Only a fragment of the housing for the air impeller is included.

Figure 2 is a side elevation (on a reduced scale) of the parts shown in Figure 1 but including the housing for the air impeller, the inlet thereto and certain connections.

Figure 3 is a transverse section through a divided exhaust manifold for an eight cylinder engine.

Figure 4 is a perspective view of the stabilizing runner.

Figure 5 is a fragmentary sectional development showing the relative positions of the dividers which separate the exhaust passages, the blades of the stabilizing runner, the turbine guide blades and the blades of the turbine runner.

The manifold comprises a tube 11 divided into eight passages 12 (to serve corresponding cylinders of an eight cylinder engine) by means of the vanes 13 which radiate from an axial core 14. The vanes 13 may be straight or helical, the latter type being described and claimed in my application Ser. No. 461,878, filed October 13, 1942 (Patent No. 2,423,602, dated July 8, 1947). An encircling shell 15 encloses a water jacket which may be used for cooling.

The manifold 11 has a flange 17 to which the supporting ring 18 of the turbo charger is bolted. This ring has an encircling flange 19 to which is bolted a hollow casting comprising the turbine housing 21 and outer casing 22 with intervening jacket spaces 23. A discharge port 24 is connected to exhaust pipe 25 (see Fig. 2).

The ring 18 has a series of vanes 26 which form prolongations of vanes 13 and support a central conical hub 27 which abuts the end of core 14. On the exit end of a ring 18 is a seat 28 for the supporting ring 29 of the turbine guide ring. This is spaced from vanes 26 and supports a circular series of radial, oblique guide vanes 31 whose inner ends are connected to flaring hub 32. At the inlet side of the vanes 31 is an annular space 30 to permit free flow to all the guide passages.

Hub 32 is connected to hub 27 by an axially extending bolt 33. The bolt carries a bearing bushing 34 on which the hub of the stabilizing runner is journaled. This runner comprises an elongated hub 35, radial oblique vanes 36 and a shroud ring 37 tying the ends of vanes 36 together. Thrust bearing rings are indicated at 38.

The stabilizing runner is simply a freely turning vaned wheel which is interposed between the ends of vanes 26 and the chamber 30, and which acts as a sort of wind wheel when engaged by an exhaust puff, and as an impeller at all other times. It may have substantial mass and thus have a considerable fly-wheel effect.

Journaled in housing 21, 22 is shaft 41. It is coaxial with the stabilizing runner, but not connected therewith. Fast to its inner end is the turbine runner 42 whose buckets or blades 43 are engaged by gases discharged from the guide passages between guide blades 31. Fast to its outer end is the air impeller 44, which receives air entering axially through inlet 45 (see Fig. 2) and discharges it radially through the diffuser 46 into the housing 47 (see Fig. 2). Housing 47 is of the snail shell type and has a discharge connection 48 which leads to pipe 49. The latter conducts the air to any point of use, such as scavenging or supercharging ports.

The turbo charger above described is an improved version of a well known commercial turbo charger, the improvement comprising a continuous entrance ring space 30 at the entrance side of the guides 31, and a stabilizing runner interposed between this space and the individual exhaust passages.

Operation

A glance at Figure 5 will indicate that in the structure of Figures 1 to 5 the stabilizing runner runs in the direction opposite to that of turbine runner 42. Being free it assumes an average and nearly uniform rotary speed, particularly if the runner be of considerable mass. The stabilizing runner applies part of the energy of the exhaust puffs to inhibiting back flow into other inactive exhaust passages. Indeed it tends to evacuate these passages.

The flows through the stabilizing runner are each local to a relatively small arc whereas the turbine runner is continuously active around its entire circumference.

The annular space 30 of Figure 1 could discharge directly to atmosphere. For example, the runner 42 could be omitted where no turbo charging effect was desired.

The examples illustrated are merely exemplary. The scope of the invention is defined solely by the claims.

What is claimed is:

1. The combination of means forming a plurality of exhaust passages through which successive independent exhaust puffs occur, the discharge ends of said passages being arranged in circular series; and a multibladed freely rotatable stabilizing runner mounted on said means coaxially with said circular series and close to the discharge ends of said passages, said runner being driven by the exhaust puffs, and serving to evacuate the exhaust passages in the intervals between puffs.

2. In an exhaust turbine for use with multicylinder engines, the combination of means enclosing an annular chamber and a plurality of exhaust passages from which successively exhaust puffs discharge into said annular chamber, the ends of the passages being arranged in circular series around the annular chamber, and said chamber having on a side remote from the exhaust passages a ring of guides adapted to discharge gases from the chamber against a turbine wheel; a rotatable turbine wheel supported by said means at the discharge side of said ring of guides and in coactive relation therewith; and a stabilizing runner having inclined blades, said runner being supported by said means and freely rotatable within said chamber in such position that as the runner rotates its blades sweep across the ends of said exhaust passages, whereby the runner is driven by the exhaust puffs and resists back-flow from the annular chamber into exhaust passages during intervals between puffs.

3. The combination defined in claim 2 in which the blading of the turbine wheel, the guides and the blades of the stabilizing runner are so coordinated that the turbine wheel and stabilizing runner rotate in relatively opposite directions.

4. The combination of a turbo-charger comprising a turbine wheel and means enclosing an annular chamber with guides for directing gases from said chamber against said wheel; means enclosing a plurality of distinct exhaust passages with their ends discharging into said annular chamber, and arranged in circular series; and a multibladed disc-like fan unit of substantial mass rotatably mounted on said means so as to turn in said chamber with its blades in close proximity to the ends of said passages, and in the path of exhaust gases discharged therefrom.

EDWARD C. MAGDEBURGER.

REFERENCES CITED

The following references are of record in the file of this patent:

UNITED STATES PATENTS

| Number | Name | Date |
|---|---|---|
| 791,055 | Stumpf | May 30, 1905 |
| 1,931,545 | Holzwarth | Oct. 24, 1933 |
| 2,284,587 | Muller | May 26, 1942 |
| 2,321,276 | De Bolt | June 8, 1943 |
| 2,375,006 | Larrecq | May 1, 1945 |

FOREIGN PATENTS

| Number | Country | Date |
|---|---|---|
| 456,989 | Great Britain | Sept. 16, 1936 |
| 662,196 | Germany | July 7, 1938 |